United States Patent
Jayawardena et al.

(10) Patent No.: US 9,876,721 B2
(45) Date of Patent: *Jan. 23, 2018

(54) METHOD AND SYSTEM FOR DYNAMIC TRAFFIC PRIORITIZATION

(71) Applicant: AT&T INTELLECTUAL PROPERTY I, L.P., Atlanta, GA (US)

(72) Inventors: Thusitha Jayawardena, Holmdel, NJ (US); Gustavo De Los Reyes, Fair Haven, NJ (US); Xiao Pan, Middletown, NJ (US); Gang Xu, Picataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/865,854

(22) Filed: Sep. 25, 2015

(65) Prior Publication Data

US 2016/0014031 A1    Jan. 14, 2016

Related U.S. Application Data

(63) Continuation of application No. 12/963,227, filed on Dec. 8, 2010, now Pat. No. 9,148,376.

(51) Int. Cl.
*H04L 12/28* (2006.01)
*H04L 12/803* (2013.01)
(Continued)

(52) U.S. Cl.
CPC ........ *H04L 47/122* (2013.01); *H04L 41/5022* (2013.01); *H04L 43/0882* (2013.01);
(Continued)

(58) Field of Classification Search
None
See application file for complete search history.

(56) References Cited

U.S. PATENT DOCUMENTS 6,782,424 B2    8/2004    Yodaiken
7,571,214 B2    8/2009    Schiavone et al.
(Continued)

OTHER PUBLICATIONS

U.S. Office Action dated Oct. 19, 2012 in U.S. Appl. No. 12/963,227.
(Continued)

*Primary Examiner* — Robert C Scheibel
(74) *Attorney, Agent, or Firm* — Hartman & Citrin LLC

(57) ABSTRACT

A method provides for the dynamic traffic prioritization in a communication network. The method electronically monitors traffic in a communication network and determines when traffic exceeds configured thresholds on the links of the communication network. Thus, the method determines a link which is potentially about to be congested in the communication network. The method categorizes the traffic on this link by an end system attached to one end of the potentially congested link into a plurality of priority categories using application layer parameters. Using a re-direct capability of the end system, the method re-directs at least one of the pluralities of priority categories of traffic to an alternate Internet Protocol address. The method uses preconfigured Quality of Service mechanisms on the provider edge router attached to the other end of the potentially congested link to guarantee a predetermined amount of bandwidth capacity of the link to traffic destined to the alternate Internet Protocol address.

19 Claims, 6 Drawing Sheets

(51) Int. Cl.
*H04L 12/24* (2006.01)
*H04L 12/26* (2006.01)
*H04L 12/801* (2013.01)
*H04L 12/851* (2013.01)
*H04L 29/06* (2006.01)

(52) U.S. Cl.
CPC .............. *H04L 43/16* (2013.01); *H04L 47/10* (2013.01); *H04L 47/24* (2013.01); *H04L 63/1458* (2013.01); *H04L 65/00* (2013.01); *H04L 65/80* (2013.01); *H04L 63/08* (2013.01)

(56) References Cited

U.S. PATENT DOCUMENTS

| | | | |
|---|---|---|---|
| 7,774,849 B2* | 8/2010 | Russell | H04L 63/1458 709/224 |
| 7,835,272 B1 | 11/2010 | Johnson et al. | |
| 8,203,954 B1 | 6/2012 | Patel et al. | |
| 8,730,794 B2* | 5/2014 | Cozens | H04L 12/5695 370/225 |
| 2002/0002686 A1 | 1/2002 | Vange et al. | |
| 2002/0019879 A1* | 2/2002 | Jasen | H04L 47/10 709/240 |
| 2002/0174208 A1 | 11/2002 | Morlitz | |
| 2004/0062199 A1 | 4/2004 | Lau et al. | |
| 2004/0177247 A1 | 9/2004 | Peles | |
| 2004/0233845 A1* | 11/2004 | Jeong | H04L 47/10 370/230 |
| 2005/0018608 A1 | 1/2005 | Wetherall et al. | |
| 2005/0213570 A1 | 9/2005 | Stacy et al. | |
| 2006/0059568 A1 | 3/2006 | Smith-Mickelson et al. | |
| 2007/0030850 A1 | 2/2007 | Grosse | |
| 2007/0153798 A1 | 7/2007 | Krstulich | |
| 2009/0129580 A1* | 5/2009 | Terpstra | H04L 45/04 379/232 |
| 2011/0134795 A1* | 6/2011 | Sutterfield | H04L 43/0882 370/254 |
| 2013/0148665 A1* | 6/2013 | Ludwig | H04L 12/1485 370/392 |

OTHER PUBLICATIONS

U.S. Office Action dated May 23, 2013 in U.S. Appl. No. 12/963,227.
U.S. Office Action dated Oct. 22, 2014 in U.S. Appl. No. 12/963,227.
U.S. Notice of Allowance dated May 20, 2015 in U.S. Appl. No. 12/963,227.

* cited by examiner

METHOD AND SYSTEM FOR DYNAMIC TRAFFIC PRIORITIZATION

CROSS REFERENCE TO RELATED APPLICATIONS

The present application is a continuation of U.S. patent application Ser. No. 12/963,227, filed on Dec. 8, 2010, now U.S. Pat. No. 9,148,376. The disclosure of this document, including the specification, drawings, and claims, is incorporated wherein by reference in its entirety.

BACKGROUND

1. Field of the Disclosure

The present disclosure relates to the field of communications. More particularly, the present disclosure relates to a method and system for dynamic traffic prioritization in a communication network, in order to mitigate adverse effects of traffic congestion on a selected subset of traffic experiencing the congestion. Such congestion can be caused during periods of exceptionally high traffic, such as during Distributed Denial of Service (DDoS) attacks, natural and man-made disasters or network failures.

2. Background Information

Typically, exceptionally high traffic volume due to unplanned events, such as during a Distributed Denial of Service attack, creates bottlenecks in two places: (a) Congestion in the communication link between the provider edge router and the end system, and (b) Exhaustion of resources such as CPU cycles and memory on the end system. These communication bottlenecks significantly reduce the effective performance of the end system, and thus, its usefulness. The present disclosure addresses the former of these bottlenecks, i.e., the congestion on the communication link between the provider edge router and the end system. The present disclosure is applicable to the situation described in (a), independent of the cause of congestion.

DETAILED DESCRIPTION

Figure 1:
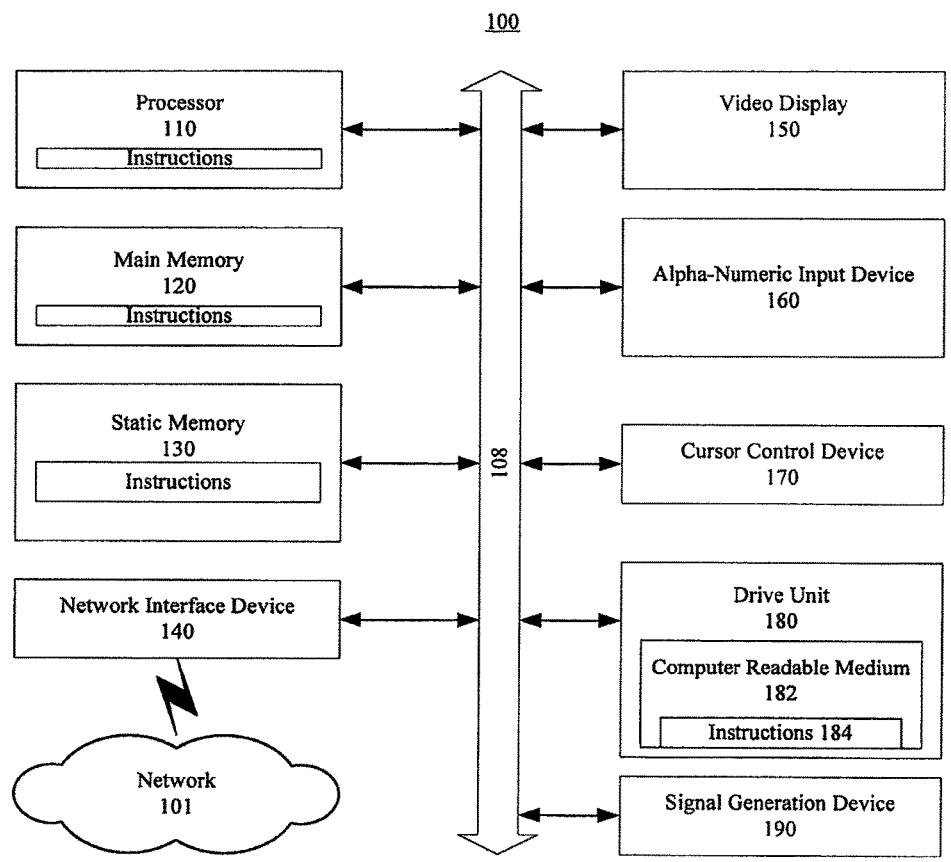
FIG. 1 shows an exemplary general computer system.

In view of the foregoing, the present disclosure, through one or more of its various aspects, embodiments and/or specific features or sub-components, is thus intended to bring out one or more of the advantages as specifically noted below. According to an embodiment of the present disclosure, a method allows for providing dynamic traffic prioritization in a communication network. An exemplary embodiment of the method is of a distributed nature, which includes monitoring the communication network to determine a congested link between a provider edge router and an end system, a triggering mechanism for initiating dynamic prioritization, selection and re-direction of traffic by the end system for dynamic prioritization to an alternate Internet Protocol (IP) address and preconfigured priority treatment via Quality of Service (QoS) mechanisms for traffic destined to the alternate IP address on the provider edge router. Thus, an exemplary embodiment of the method includes functionality that is distributed across a monitoring system, the end system and the provider edge router.

The method includes electronically monitoring traffic in the network and determining when bandwidth utilization on a link exceeds a predetermined threshold. The method also includes determining a link in the network that is a potential congestion point and initiating the dynamic prioritization scheme when such predetermined thresholds are exceeded. The initiation of the dynamic prioritization can be done either by electronic signaling or by a human operator. The method further includes categorizing traffic on the link into a plurality of priority categories based on application layer parameters embedded in the traffic, of which devices inside the communication network including the provider edge router are, typically, agnostic. This categorization is done by the end system attached to one end of the link. The method further includes the end system re-directing at least one of the selected pluralities of categories of traffic to an alternate destination Internet Protocol address which is given higher priority on the congested link through Quality of Service mechanisms that are pre-configured on the provider edge router, which is attached to the other end of the link. This alternate IP address is, optionally, bound to the same end system. The method further includes the end system re-directing the selected pluralities of traffic to a plurality of IP addresses which get a plurality of QoS treatment on the provider edge router through preconfigured QoS mechanisms. The plurality of IP addresses are, optionally, bound to the same end system.

The present disclosure is applicable to situations where the end system has the ability to select traffic based on application layer parameters and redirect the selected traffic to an alternate IP address which, optionally, is bound to the same physical end system. Well-known examples of such end systems are SIP (Session Initiation Protocol) proxy servers and Web servers using HTTP (Hypertext Transfer Protocol). Therefore, the following disclosure refers mainly to the SIP proxy servers and their application in Voice over IP service. However, as mentioned above the method disclosed herein has wider application than SIP proxy servers.

In another embodiment, the dynamic traffic prioritization is implemented on a plurality of congestion links by a plurality of end systems and a plurality of edge routers.

In a further embodiment, the potential traffic congestion link is located between a provider edge router and an end system such as a Session Initiation Protocol (SIP) proxy server.

In an embodiment, the selected traffic for higher priority treatment includes Voice over Internet Protocol (VoIP) calls.

In another embodiment, the traffic selection for re-direction includes analyzing the called area code or the called telephone number or the called user ID of the VoIP calls.

In a further embodiment, the selection of traffic for re-direction includes analyzing and selecting both control and voice portions of a Session Initiation Protocol (SIP) dialog based on SIP and/or (Session Description Protocol) SDP parameters in the SIP and/or SDP headers.

In an embodiment, traffic congestion is caused by a Distributed Denial of Service (DDoS) attack.

In an embodiment, the traffic destined to the re-directed IP address is guaranteed a predetermined amount of bandwidth capacity on the link that has been determined to be congested.

In another embodiment, the re-directing is performed only after the traffic in the selected category is authenticated via an authentication server in the SIP network.

In another embodiment, a plurality of alternate IP addresses are used to redirect the categories of critical calls, the plurality of alternate IP addresses, which, optionally, are bound to the same end system, being used to provide different levels of guaranteed bandwidth in the congested link by the edge router.

In a further embodiment, a low priority category of communication traffic is re-directed to an alternate IP address, which is mapped to a different Quality of Service (QoS) class on the provider edge router, which limits the bandwidth available to the low priority category of traffic during congestion while all other traffic is guaranteed the remaining portion of the total bandwidth of the link.

In an embodiment, the re-directing of a priority category of traffic includes re-directing the priority category of traffic to other proxy servers, which, optionally, share the same congested link with the provider edge router.

In a further embodiment, the re-directing of a priority category of communication traffic includes a plurality of re-directing stages preceded by a plurality of selection stages.

In an embodiment, wherein the plurality of re-directing stages includes a first stage wherein all selected high priority traffic is re-directed to a first IP address, and a second stage wherein only authenticated high priority traffic in the first stage is re-directed to a second IP address.

In another embodiment, the communication traffic uses Hypertext Transfer Protocol (http) on a distributed hypermedia information system.

In an embodiment the dynamic prioritization scheme is embodied in a distributed system consisting of a traffic monitoring system, a traffic selection system, a traffic re-direction system and a traffic priority system. Typically, the traffic monitoring system is embodied in a stand-alone system that monitors the communication network using traffic information generated and sent to the monitoring system by routers and switches of the communication network; the traffic selection system and the traffic redirection system are, optionally, embodied in the same end system; the traffic priority system is embodied in the edge router of the communication network.

In a further embodiment, a non-transitory computer-readable storage medium, encoded with a computer-executable program provides for a dynamic traffic prioritization in a communication network, includes a first determining segment for determining a potential traffic congestion link in the communication network by monitoring traffic; and a separate, corresponding selection and redirection segment in the end system for redirecting selected traffic on the congested link to a plurality of IP addresses. The medium further includes a signaling segment that signals the end system to initiate dynamic redirection. The corresponding executable program on the end system includes a re-directing segment for re-directing at least one of the pluralities of traffic selected based on application layer parameters embedded in the traffic to an alternate IP address.

In an embodiment, the dynamic traffic prioritization is implemented on a plurality of edge router links and a plurality of end systems.

FIG. 1 is an illustrative embodiment of a general computer system, on which a method for providing dynamic traffic prioritization can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
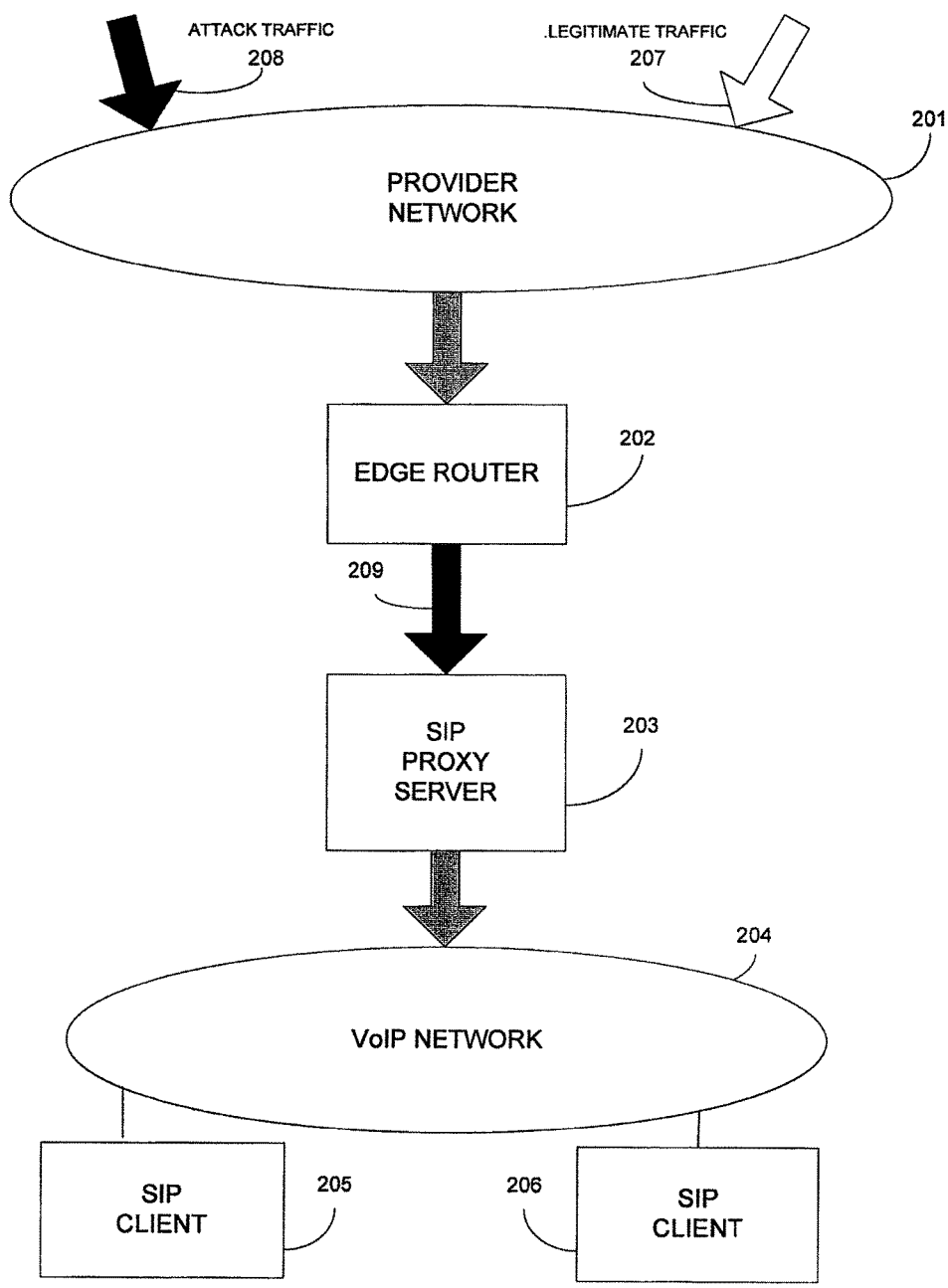
FIG. 2 shows an illustration of a communication network, including an Edge Router and an SIP Proxy Server for Voice over Internet Protocol (VoIP) service, which is a particular example of an end system.

FIG. 2 shows an illustration of a communication network, including an Edge Router and an SIP Proxy Server for Voice over Internet Protocol (VoIP) service. The provider network 201 is linked to the Provider Edge Router 202, which is further linked to the SIP Proxy Server 203. The SIP Proxy Server 203 is connected to the VoIP Network. Also illustrated are SIP Proxy Clients 205 and 206. Legitimate communication traffic 207 is illustrated, along with Attack Traffic 208.

During reception of a significant amount of Attack Traffic 208, congestion in the communication network will likely occur. Such congestion will likely occur only on the link 209 between the Carrier Edge Router 202 and the SIP Proxy Server 203, since the links in the core of the provider network are typically over-engineered to carry unexpectedly high traffic volumes.

Usually in a set of traffic, there exists a subset of VoIP calls that are more important than the rest of the calls. This subset usually can only be recognized from an application layer, i.e., layer seven of the Open System Interconnection (OSI) model, using parameters such as the called area code or called telephone number, called user ID, calling area code or telephone number, etc.

The new method described herein enables the prioritization of such a subset of VoIP calls, which are more important than the rest of the calls, based on a distributed scheme where the SIP server and the provider edge router both play a part in the overall method. As a result, this method guarantees a predetermined amount of capacity on a congested communication link for such important calls. Additionally, there may be a plurality of different prioritizations into which the traffic may be categorized.

Additionally, if the communication traffic congestion is due to botnets flooding the network with malicious traffic, this method allows for the subset of critical traffic to be redirected using the SIP's built-in redirection capability. Simple bots, for example, are stateless flooding machines that will not follow the redirection directive and, therefore, will not get priority in the congested link.

The method is a way of providing priority at the congestion points to traffic belonging to a critical subset of calls. However, typically, there are no layer 3 or layer 4 parameters to distinguish the subset of critical calls. These calls generally originate from anywhere in the Internet. Additionally, these calls are destined to shared SIP servers that serve both the subset of important calls, as well as, other calls.

Routers are optimized to forward packets based on layer-3 information. They have a limited capacity for examining and acting on layer 4 parameters with emerging capabilities for deep packet inspection (DPI) that examine higher layer information. However, DPI is a capability that should be used selectively since, typically, using DPI causes forwarding performance degradation. Therefore, the ability to distinguish packets based on application layer information will likely remain limited on carrier-class provider core and edge routers.

SIP-based VoIP has a SIP/SDP-based control portion and a corresponding RTP-based media portion. To provide priority to both of these portions based on application layer parameters, a device needs to track the state of the call. This is a typical SIP server or firewall function that is better suited at end points or close to end points of communicating entities. Even with mature DPI capability, prioritizing VoIP calls based, for example, on a called area code requires tracking control and media portions of the call, which is quite difficult on carrier-class provider edge routers that are optimized for high volume traffic forwarding.

However, since the link on the Edge Router 202 is the first potential bottleneck, it is important to prioritize traffic belonging to the critical subset of calls on this link. Therefore, the ability to distinguish this traffic on the Edge Router 202, i.e., in the network rather than at the end points, is critical.

Thus, during a congestion event characterized by a significant amount of Attack Traffic 208, the method redirects a subset of critical calls to an alternate IP address. This function is performed via SIP client redirection signaling from the SIP proxy server 203 in a VoIP network. As a variation of this method, the calls may be redirected only after they are authenticated, or in conjunction with a staged redirection and authentication process. Such an authentication process would prevent any Attack Traffic 208 from getting redirected.

On the Edge Router 202, traffic destined to the alternate IP address is mapped to a separate Quality of Service (QoS) class. A separate queue with a guaranteed bandwidth for this QoS class is preconfigured on the Edge Router 202. It is noted that other communication traffic can use this capacity when the redirected traffic does not need all of the dedicated bandwidth. Furthermore, if the Attack Traffic 208 is not aimed at a subset of area codes that are redirected, then the Attack Traffic 208 does not get priority on this communication link 209.

Figure 3:
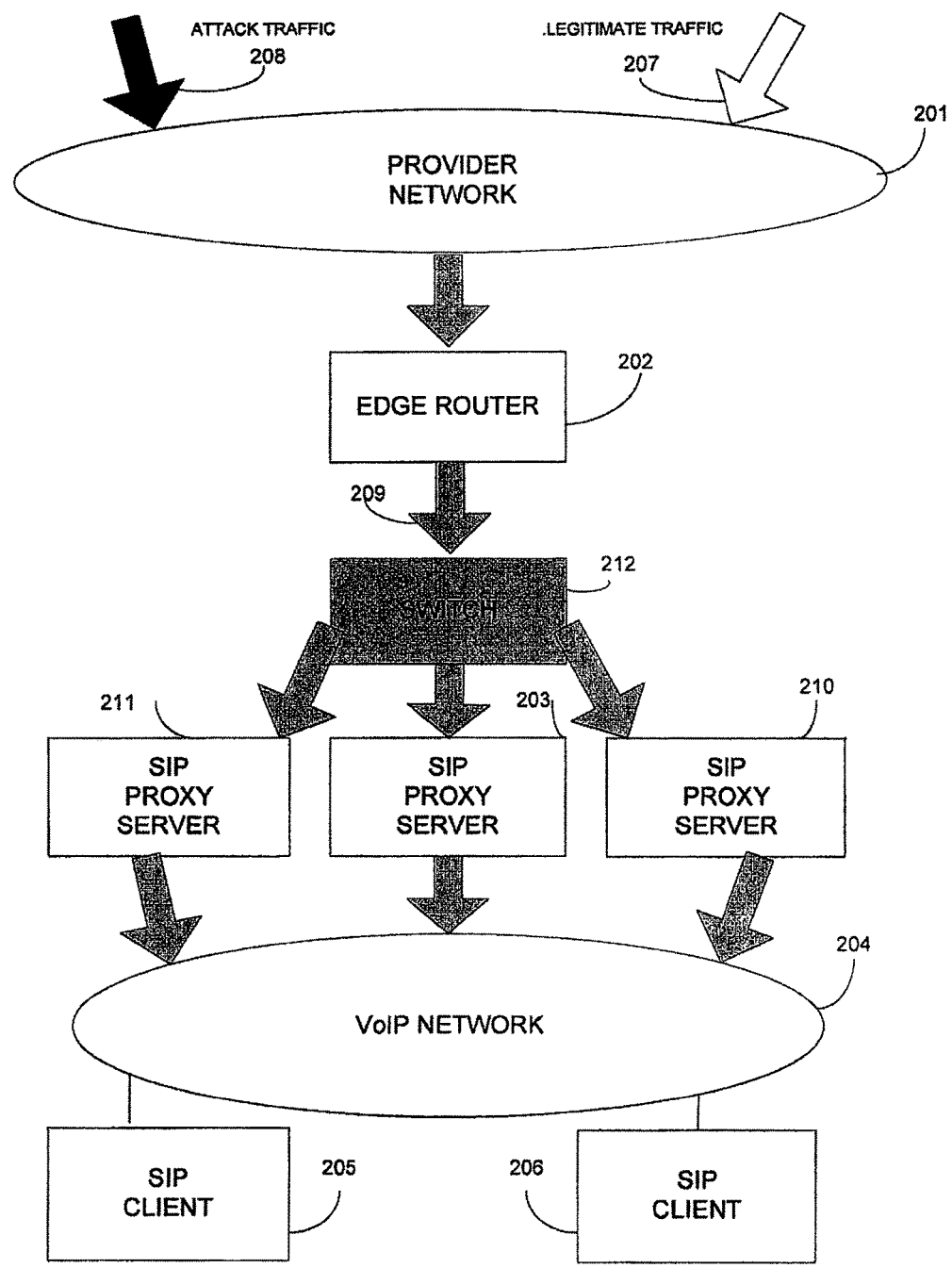
FIG. 3 shows an illustration of a communication network, including an Edge Router, a Layer-2 Switch, and a plurality of SIP Proxy Servers.

FIG. 3 shows an illustration of a communication network, including an Edge Router 202, a layer-2 Switch 212, and a plurality of SIP Proxy Servers 203, 210, 211. FIG. 3 is similar to FIG. 2. However, FIG. 3 includes a Layer-2 Switch 212, and additional SIP Proxy Servers 210 and 211.

The QoS class and queue on the Edge Router 202 can be preconfigured as discussed previously. Furthermore, multiple IP addresses from different subnets can be used dynamically for redirection at different times to conceal the redirection IP addresses from attackers. Alternatively, non-critical calls can be redirected to an alternate IP address that is mapped to a different QoS class on the Edge Router 202, which limits the bandwidth available to non-critical traffic during congestion. Traffic can be redirected to other SIP Proxy Servers, such as SIP Proxy Servers 210 and 211, or to the same SIP Proxy Server 203, but to an alternate IP address, when the SIP Proxy Server can be bound to multiple IP addresses.

This method is effective in providing VoIP service to a subset of critical calls during congestion which may be caused by various reasons, such as (1) unplanned network failures, (2) flooding DDoS attacks that use stateless TCP/UDP/IP floods, (3) SIP floods, (4) RTP floods, (5) attacks launched by botnets that do not implement full SIP/RTP portions of VoIP, and (6) SIP/RTP attacks launched with full protocol stack that do not target a subset of critical area codes or other application layer parameters. Furthermore, in the embodiment of the method wherein only authenticated calls are redirected, the method will mitigate even full SIP/RTP attacks targeting critical area codes or other application layer parameters.

This method can be extended to use multiple redirections. For instance, initially, all critical calls may be redirected. Then, from the alternate address, only those calls that are authenticated may be subsequently redirected. Each redirected traffic class will have a separate QoS treatment in the network.

It is further noted that the method can be used with no changes to the SIP protocol. Additionally, the method can be used with other applications, which allow for redirection such as Hypertext Transfer Protocol (http).

Referring to FIG. 3, the additional security of the method will be discussed. For example, in the occurrence of a DDoS SIP flood targeting an SIP Proxy Server 203, SIP Proxy Server 203 can redirect calls to SIP Proxy Servers 211 and 210. SIP Proxy Servers 211 and 210 have sufficient link and resource capacity to handle an extra communication load. Thus, the Edge Router 202 is preconfigured to prioritize traffic to SIP Proxy Servers 211 and 210. However, this prioritization would play a role only during congestion on the link 209.

Since the attack is a SIP flood, the Attack Traffic 208 will continue to SIP Proxy Server 203. On the congested communication link 209 from the Edge Router 202 to the Layer 2 Switch 212, the valid traffic to SIP Proxy Servers 211 and 210 will get priority at the expense of the traffic to SIP Proxy Server 203. The traffic to SIP Proxy Server 203 will be the Attack Traffic 208 and the initial "invite" SIP packets of new calls to SIP Proxy Server 203.

Figure 4:
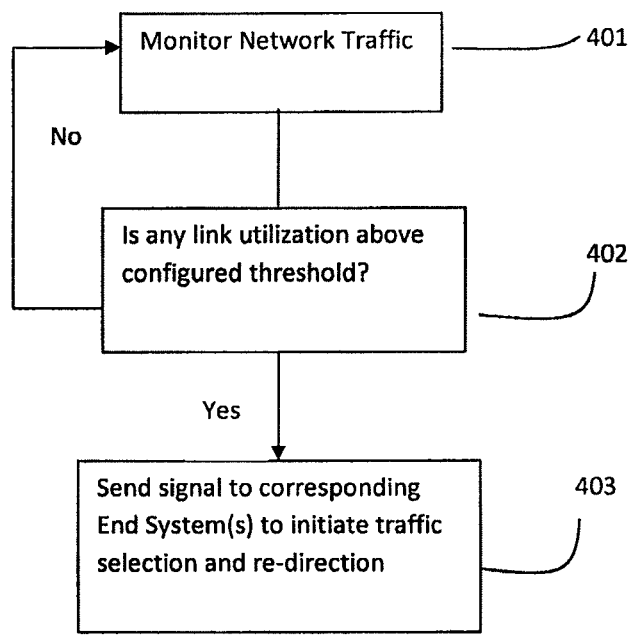
FIG. 4 is a flowchart depicting an exemplary method for providing the monitoring, including triggering of dynamic traffic prioritization in a communication network, according to an aspect of the present disclosure.

FIG. 4 shows a flowchart depicting an exemplary method for providing dynamic traffic prioritization in a communication network, according to an aspect of the present disclosure. FIG. 4 illustrates that the method monitors network traffic 401. The method determines potential congestion links in the network based on preconfigured utilization thresholds 402. The method further electronically signals the corresponding End Systems to initiate dynamic traffic prioritization when potential congestion links are detected 403.

FIG. 4 also illustrates that the method determines when utilization on links exceed predetermined thresholds (402). When the predetermined thresholds are not exceeded, the method continues to monitor network traffic 401. Alternatively, when the predetermined threshold is exceeded, the method signals the corresponding End System to initiate dynamic traffic prioritization. The method then continues to monitor network traffic 401.

Figure 5:
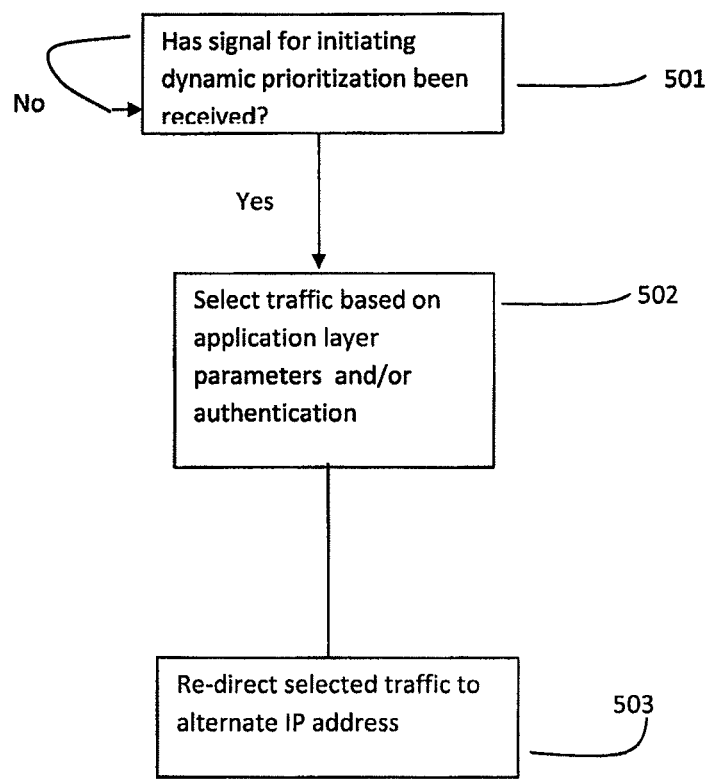
FIG. 5 is a flowchart depicting an exemplary method for providing the selection of traffic for dynamic traffic prioritization in a communication network, according to an aspect of the present disclosure.

FIG. 5 illustrates the corresponding flowchart that would be implemented in an exemplary embodiment on the End System. The End System continues to listen for a signal to initiate dynamic traffic prioritization until such a signal is received 501. When such a signal is received, the End System selects traffic based on application layer parameters and/or authentication 502. Then, the End System re-directs selected traffic to alternate IP address 503.

Figure 6:
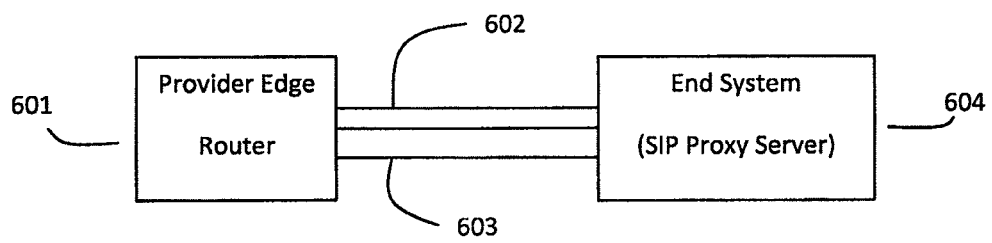
FIG. 6 shows an exemplary method for providing the traffic prioritization during congestion on the link between the provider edge router and the end system in a communication network, according to an aspect of the present disclosure.

FIG. 6 illustrates how the traffic destined to the alternate IP address is given priority on the congested link through preconfigured Quality of Service mechanisms. The provider edge router 601 guarantees a preconfigured amount of bandwidth 602 to traffic destined to the alternate IP address. The traffic destined to the original IP address uses the rest of the link bandwidth 603 during congestion. The End System 604 is attached to the other end of the link.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the method for providing dynamic traffic prioritization may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   electronically monitoring traffic in a communication network;
   determining when traffic utilization on a communication link between an edge router and a primary proxy server in the communication network exceeds a predetermined threshold;
   initiating dynamic traffic prioritization;
   categorizing traffic on the communication link into a plurality of priority categories of traffic;
   redirecting traffic associated with a priority category of traffic of the plurality of priority categories of traffic to a first alternate Internet Protocol address assigned to a first alternate proxy server; and
   providing priority to the traffic destined to the first alternate Internet Protocol address on the edge router, wherein a second alternate Internet Protocol address assigned to the first alternate proxy server is used after a predetermined period of time to redirect the traffic associated with the priority category of traffic.

2. The method of claim 1, wherein the dynamic traffic prioritization is implemented on a plurality of communication links.

3. The method of claim 1, wherein the edge router includes a carrier edge router and the primary proxy server includes a Session Initiation Protocol proxy server.

4. The method of claim 3, wherein the traffic includes Voice over Internet Protocol calls.

5. The method of claim 4, further comprising selecting the priority category of traffic for prioritization, wherein selecting the priority category of traffic for prioritization comprises analyzing application layer parameters of the Voice over Internet Protocol calls.

6. The method of claim 5, wherein selecting the priority category of traffic for prioritization further comprises analyzing and selecting a control portion and a media portion of a Session Initiated Protocol based Voice over Internet Protocol call.

7. The method of claim 1, wherein the traffic utilization exceeding the predetermined threshold is caused by a Distributed Denial of Service attack.

8. The method of claim 1, wherein the traffic associated with the priority category of traffic is guaranteed a predetermined amount of capacity on the communication link associated with the traffic utilization exceeding the predetermined threshold.

9. The method of claim 4, wherein redirecting the traffic associated with the priority category of traffic includes redirecting a priority category of critical calls to an alternate Internet Protocol address via a Session Initiated Protocol proxy redirection signaling to a Session Initiated Protocol client in a Voice over Internet Protocol network.

10. The method of claim 1, wherein redirecting the traffic associated with the priority category of traffic is performed only after the traffic associated with the priority category of traffic is authenticated.

11. The method of claim 1, wherein the second alternate Internet Protocol address is assigned to a second alternate proxy server after a predetermined period of time to redirect the traffic associated with the priority category of traffic.

12. The method of claim 1, wherein a low priority category of communication traffic is redirected to a third alternate Internet Protocol address, which limits bandwidth available to the low priority category of communication traffic during congestion.

13. The method of claim 1, wherein the first alternate Internet Protocol address assigned to the first alternate proxy server includes an alternate Internet Protocol address of the primary proxy server, and wherein the primary proxy server has multiple Internet Protocol addresses.

14. The method of claim 1, wherein redirecting the traffic associated with the priority category of traffic includes a plurality of redirecting stages.

15. The method of claim 14, wherein the plurality of redirecting stages includes a first stage wherein all high priority traffic in a high priority category is redirected to a first Internet Protocol address, and a second stage wherein only authenticated high priority traffic in the first stage is redirected to a second Internet Protocol address.

16. The method of claim 1, wherein the traffic uses Hypertext Transfer Protocol on a distributed hypermedia information system.

17. A non-transitory computer-readable storage encoded with a computer-executable program that, when executed, causes a processor to perform operations comprising:
   electronically monitoring traffic in a communication network;
   determining when traffic utilization on a communication link between an edge router and a primary proxy server in the communication network exceeds a predetermined threshold;
   initiating dynamic traffic prioritization;
   categorizing traffic on the communication link into a plurality of priority categories of traffic;
   redirecting traffic associated with a priority category of traffic of the plurality of priority categories of traffic to a first alternate Internet Protocol address assigned to a first alternate proxy server; and
   providing priority to the traffic destined to the first alternate Internet Protocol address on the edge router, wherein a second alternate Internet Protocol address assigned to the first alternate proxy server is used after a predetermined period of time to redirect the traffic associated with the priority category of traffic.

18. The non-transitory computer-readable storage of claim 17, wherein the dynamic traffic prioritization is implemented utilizing a plurality of communication links.

19. A system comprising:
   a plurality of communication links comprising a communication network;
   a monitor that electronically monitors traffic in the communication network, and that determines when utilization of a communication link exceeds a predetermined threshold causing a congested link;
   a controller that signals an end system to initiate dynamic traffic prioritization in the communication network;
   a selector that categorizes traffic on the congested link into a plurality of priority categories of traffic;
   a redirector that redirects traffic associated with a priority category of traffic of the plurality of priority categories of traffic to a first alternate Internet Protocol address, wherein the redirector redirects the traffic associated with the priority category of traffic to a second alternate Internet Protocol address after a predetermined period of time; and
   a prioritizer that prioritizes the traffic redirected to the first alternate Internet Protocol address and the second alternate Internet Protocol address on the congested link.

* * * * *